US008533206B1

(12) United States Patent
Guha et al.

(10) Patent No.: US 8,533,206 B1
(45) Date of Patent: Sep. 10, 2013

(54) FILTERING IN SEARCH ENGINES

(75) Inventors: Ramanathan Guha, Los Altos, CA (US); Vrishali Wagle, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/588,905

(22) Filed: Aug. 17, 2012

Related U.S. Application Data

(63) Continuation of application No. 12/013,260, filed on Jan. 11, 2008, now Pat. No. 8,250,080.

(51) Int. Cl.
*G06F 7/00* (2006.01)
*G06F 17/30* (2006.01)

(52) U.S. Cl.
USPC .......................................... 707/754; 707/705

(58) Field of Classification Search
None
See application file for complete search history.

(56) References Cited

U.S. PATENT DOCUMENTS

| | | | |
|---|---|---|---|
| 6,360,215 B1 | 3/2002 | Judd et al. | |
| 7,647,329 B1 | 1/2010 | Fischman et al. | |
| 7,668,812 B1 | 2/2010 | Riley et al. | |
| 7,680,875 B1 | 3/2010 | Shopiro et al. | |
| 7,886,043 B1 | 2/2011 | Chan et al. | |
| 8,239,445 B1 * | 8/2012 | Gage et al. | 709/203 |
| 8,250,080 B1 | 8/2012 | Guha et al. | |
| 2003/0005036 A1 | 1/2003 | Mitzenmacher | |
| 2004/0193879 A1 | 9/2004 | Sonoda et al. | |
| 2005/0033803 A1 | 2/2005 | Vleet et al. | |
| 2005/0086520 A1 | 4/2005 | Dharmapurikar et al. | |
| 2007/0050280 A1 | 3/2007 | Madle et al. | |
| 2007/0083671 A1 * | 4/2007 | Linn et al. | 709/245 |
| 2007/0115986 A1 | 5/2007 | Shankara | |
| 2007/0199054 A1 | 8/2007 | Florencio et al. | |
| 2009/0070872 A1 * | 3/2009 | Cowings et al. | 726/23 |
| 2009/0089278 A1 * | 4/2009 | Poola et al. | 707/5 |
| 2011/0087648 A1 * | 4/2011 | Wang et al. | 707/709 |

OTHER PUBLICATIONS

Bloom, B., "Space/Time Trade-offs in Hash Coding with Allowable Errors," *Communications of the ACM*; vol. 13, No. 7; Jul. 1970; pp. 442-426.
National Institute of Standards and Technology, "Bloom Filter," downloaded from http://www.nist.gov/dads/HTML/bloomFilter.html on Jan. 1, 2008; 1 page.

* cited by examiner

*Primary Examiner* — Wilson Lee
*Assistant Examiner* — Jessica N Le
(74) *Attorney, Agent, or Firm* — Fish & Richardson P.C.

(57) ABSTRACT

In an embodiment, the size of a filter in a search engine is dynamically adjusted in order to reduce filter error. The filter, for example, may be a domain filter that contains domain(s) of preferred search results. A search engine processes the query and the domain filter to create a set of search results that are relevant to the query terms and for which a selected portion of the search results satisfy the domain filter, in that such portion of the documents come from domains in the filter. The search results may then be provided to the user, as a set of search results that are relevant to the query terms and which include some portion of results that match the query labels. The construction of the domain filter may be done with a Bloom filter approach, using domain prefixes from annotations.

24 Claims, 5 Drawing Sheets

| URL Pattern | Path component | Length of path component (Pattern length) |
|---|---|---|
| http://www.pbase.com/pg* | /pg | 3 |
| http://www.lagen.nu/dom/* | /dom/ | 5 |
| http://www.sos.se/sosfs/* | /sosfs/ | 7 |
| http://www.cambridgeincolour.com/tutorials/* | /tutorials/ | 11 |
| http://www.accessit.nda.ie/checklist_1* | /checklist_1 | 12 |
| http://www.svk.se/upload/3320/* | /upload/3320/ | 13 |
| http://www.oree.mine.nu/lappfjallens* | /lappfjallens | 13 |
| http://www.csn.se/Avdelningar/OmCSN* | /Avdelningar/OmCSN | 18 |
| http://www.nutek.se/content/1/c4/10/21/* | /content/1/c4/10/21/ | 20 |
| http://www.metz.de/en/photo_electronics/* | /en/photo_electronics/ | 22 |

FIG. 5

FILTERING IN SEARCH ENGINES

CROSS-REFERENCE TO RELATED APPLICATION

This application claims priority to and is a continuation of U.S. patent application Ser. No. 12/013,260, "Improved Filtering in Search Engines", filed on Jan. 11, 2008. The disclosure of the prior application is considered part of and is incorporated by reference in the disclosure of this application.

FIELD OF THE INVENTION

The present invention in general relates to search engines.

RELATED ART

The development of information retrieval systems has predominantly focused on improving the overall quality of the search results presented to the user. The quality of the results has typically been measured in terms of accuracy, recall, or other quantifiable measures of performance. Information retrieval systems, or 'search engines' in the context of the Internet and World Wide Web, use different techniques to improve the quality and usefulness of the search results. These techniques may address certain aspects of search engine design such as basic indexing algorithms and document presentation.

An inherent problem in the design of search engines is that the relevance of search results to a particular user depends on factors that are highly dependent on the user's intent in conducting the search, that is, why they are conducting the search, as well as the user's circumstances, the facts pertaining to the user's information need. Thus, given the same query by two different users, a given set of search results can be relevant to one user and irrelevant to another, entirely because of the different intent and information needs.

Most attempts at solving the problem of inferring a user's intent typically depend on relatively weak indicators, such as static user preferences, or predefined methods of query reformulation that may be educated guesses about what the user is interested in based on the query terms. Approaches such as these cannot fully capture user intent because such intent is itself highly variable and dependent on numerous situational facts that cannot be extrapolated from typical query terms.

At times, because of the inability of contemporary search engines to consistently find information that satisfies the user's information need, and not merely the user's query terms, users frequently turn to websites that offer additional analysis or understanding of content available on the Internet. Such sites may include articles labeled as "expert level," or a particular review as "negative professional review," or a new product announcement as "new camera". A user interested in a particular point of view, type of information, or the like then searches within the domain of such a site for articles or links that have certain associated labels or comments. For example, a user could search the aforementioned digital camera site for all camera reviews labeled "camera". However, while such sites provide extensive useful information that the user can access to address a particular current information need, the problem remains that search results may not be filtered based on content that may offer such specific information.

In order to improve the quality of search results, search results may need to be filtered based on content sought by a user. Furthermore the quality of filtered results may depend on how accurately results returned by a search engine are filtered without rejecting relevant results.

Systems and methods are needed that improve filtering of search results and help users searching for information by providing them with results relevant to their intent in performing the search.

BRIEF SUMMARY

The present invention relates to systems and methods for improved filtering in search engines. In embodiments of this invention, the quality of search results is improved through filtering of search results using dynamic adjustment of domain filter size to minimize filter error.

The construction of the domain filter may be done with a Bloom filter approach, using domain prefixes from annotations. The Bloom filter may have a small false positive rate, and thus the search results may contain documents that come from the domains that match the query labels, but which themselves do not satisfy the complete URL pattern for an annotation. This Bloom filter error, due to its false positive rate, may be minimized by dynamically adjusting the size of the filter. Thus, a larger number of search results are ensured to be from domains that match the domain filter.

Further embodiments, features, and advantages of the invention, as well as the structure and operation of the various embodiments of the invention are described in detail below with reference to accompanying drawings.

BRIEF DESCRIPTION OF FIGURES

FIG. 5 is table illustrating examples of URL patterns, corresponding path components and pattern lengths.

DETAILED DESCRIPTION OF EMBODIMENT(S)

Figure 1:
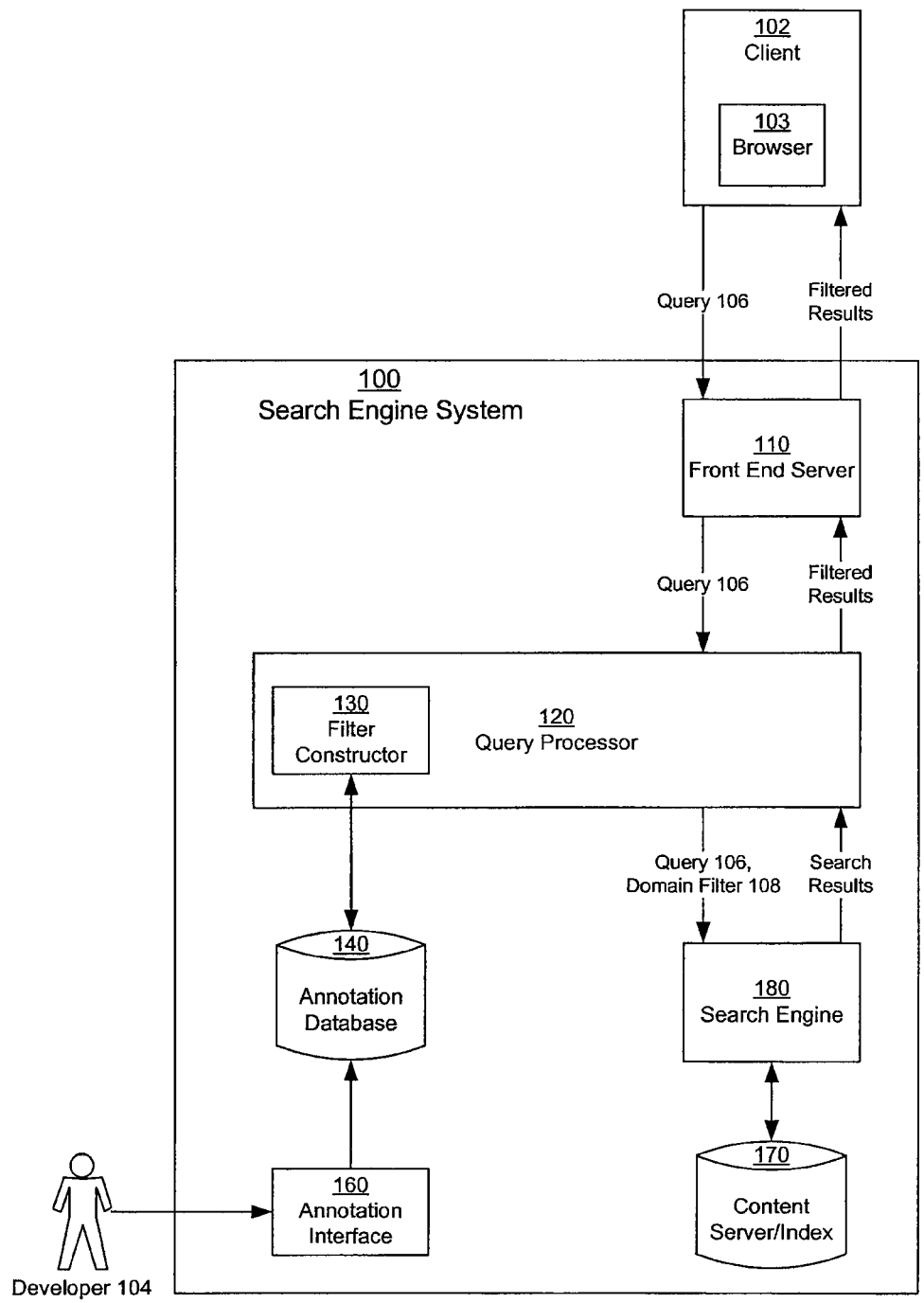
FIG. 1 illustrates a generalized system architecture for a search engine according to an embodiment of the invention.

In an embodiment, the size of a filter in a search engine is dynamically adjusted in order to reduce filter error. The filter, for example, may be a domain filter that contains domain(s) of preferred search results. A search engine processes a query with the domain filter to create a set of search results that are relevant to the query terms and for which a selected portion of the search results satisfy the domain filter. To satisfy the domain filter the selected portion of the documents come from domains identified in the domain filter. The search results may then be provided to the user, as a set of search results that are relevant to the query terms and which include some portion of results that match the query labels.

The construction of the domain filter may be done with a Bloom filter approach, using URL prefixes from URL annotations. The domain filter may have a small false positive rate. This false positive rate may result from an inherent false positive rate of the underlying Bloom filter and any approximation method used to construct the domain filter, if such an approximation method is used. Thus the search results may contain documents that come from the domains that match the domain filter, but which do not satisfy the query labels. This domain filter error, due to its false positive rate, may be minimized by dynamically adjusting the size of the domain filter. Thus, a larger number of search results are ensured to be from domains that match the domain filter.

In this way, filtering of search results may be improved through dynamic adjustment of the size of a domain filter.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "offset" used herein refers to character(s) that appear after a domain name in a uniform resource locator (URL). As an illustrative example, in an URL such as "www.abc.com/reviews", the offset may be '/reviews'. This example is not intended to limit the definition.

The term "offset error" used herein refers to the number of characters in an offset that are ignored. As an illustrative example, consider the URL "www.abc.com/reviews". The offset would be"/reviews". If, for example, the offset is reduced to "/rev", the resultant offset error would be '4' as 4 characters within the offset, namely 'iews' have been ignored.

| Table of Contents | |
|---|---|
| I. | System |
| II. | Implementing the Domain Filter as a Dynamically Adjustable Bloom Filter |
| | a) Bloom Filter |
| | b) Offset Errors and Effects on Size of the Domain Filter |
| | c) Filter Constructor |
| | d) Offset Selector |
| | e) Dynamically Adjusting the Size of the Domain Filter |
| III. | Example Operation of a Pattern Lengths Calculator |
| IV. | Example Operation of a Lengths Populator |
| V.. | Example Operation of an Offset Error Calculator |
| VI. | Conclusion |

I. SYSTEM

Referring to FIG. 1, there is shown a system architecture for a search engine system in accordance with one embodiment. In this system architecture, there is a client device 102 and search engine system 100. The search engine system 100 comprises a front end server 110, a query processor 120, filter constructor 130, domain filter 108, search engine 180, content server 170, annotation database 140, annotation interface 160 and developer 104.

Client 102 can be any type of client, including any type of computer (e.g., desktop computer, workstation, notebook, mainframe, terminal, set-top box etc.), handheld device (personal digital assistant, cellular phone, etc.), or the like. Client device 102 need only have the capability to communicate over a network (e.g. Internet, telephony, LAN, WAN, or combination thereof) with the search engine system 100. Typically, a client device 102 will support a browser application 103, and the appropriate networking applications and components, all of which are known to those of skill in the art.

Front end server 110 is adapted to receive a query from the client 102 and pass it to the query processor 120, and then subsequently receive the search results back from the query processor 120 and provide them to the client 102. The front end server 110 is further adapted to handle the queries from multiple different clients 102 concurrently.

The figure does not show a number of conventional components (e.g. network, data servers, firewalls, routers, domain name servers, load balancers, etc.) in order to not obscure the relevant details of the embodiment. The overall system operation may be described as follows. Reference is also made for clarity to specific embodiments and examples not intended to limit the invention.

Front end server 110 provides the basic interface for receiving search query(ies) and providing search results to client 102. A query 106 may comprise one or more terms and in addition may have one or more labels. Query processor 120 is adapted to receive a query 106 from the front end server 110 and pass query 106, along with a corresponding domain filter 108 based on the labels to the search engine 180.

In an embodiment, a filter constructor 130 is provided to generate a domain filter 108. Domain filter 108 may be generated based on selecting annotations in the annotation database 140 that have labels that match the query labels and using the domains identified in these matching annotations. The size of domain filter 108 is dynamically adjusted in order to minimize a domain filter error. According to a feature domain filter 108, may be a Bloom filter as described below.

Search engine 180 processes query 106 and domain filter 108 and returns to the query processor 120 a set of search results that are relevant to the query terms and for which a selected portion of the search results satisfy domain filter 108, in that the selection portion of documents are from domains included in the domain filter 108. These search results may be provided to user 102.

In an embodiment, the query processor 120 may further process the search results to produce a result set in which a selected portion of the documents have labels that match the query labels. The query processor 120 may then rank the result set using the label matches, and provides a result set to the front end server 110. The front end server 110 may then return the filtered and ranked results to the client 102.

It is helpful to discuss the operation of query processor 120 and filter constructor 130 with respect to query 106 and label(s) in even further detail and with reference to an example annotation database 140. Annotation database 140 may contain a large collection of annotations. Generally, an annotation includes a pattern for a uniform resource locator (URL) for the URLs of documents, and a label to be applied to a document whose URL matches the URL pattern. Schematically, an annotation may take the form:

<label, URL pattern> where label is a term or phrase, and URL pattern is a specification of a pattern for a URL.

For example, the annotation

<"professional review", www.digitalcameraworld.com/review/> would be used to apply the label "professional review" to any document whose URL includes a prefix matching the network location "www.digitalcameraworld.com/review/". All documents in this particular host's directory are considered by the provider of the annotation to be "professional review(s)" of digital cameras. In one embodiment, the URL pattern can include wildcards as well as regular expressions. The term "document" is used herein to refer to any and all types of content that can be accessed by a client over a network.

In another embodiment, a URL pattern can have host suffix patterns or a combination of both URL prefix pattern(s) or host suffix patterns. As an example of host suffix patterns, consider the following patterns:

\*.stanford.edu; and

\*.cs.stanford.edu

In the above example host suffix patterns, \*.stanford.edu may correspond to a path length of 2 and \*.cs.stanford.edu may correspond to a path length of 3. In an embodiment, path length may represent the number of alpha-numeric characters that may appear in addition to a domain in a URL pattern. Examples of path lengths or lengths of path components are illustrated in and discussed further below with respect to FIG. 5.

As mentioned above, a query may comprise one or more terms and/or one or more labels. For example, a query may be "camera label: professional review" where the term "camera" is the query term, and the token "label:" indicates that the following term is a label of interest. Thus, in this example, the user is searching for documents that have been labeled (by one or more individuals, such as other users, experts, etc.) as being 'professional reviews' and have the term 'camera'.

The particular syntax used to indicate labels (as differentiated from query terms) is not limited to the use of "label:" and other tokens or formats can be used as well.

Query processor 120 may receive a query from the front end server 110 and determines if it includes any labels. If no labels are present, then the query is passed to the search engine 180. Labels can be identified by specific token such as "label", or other syntactic devices (e.g., parenthetical, symbols such as "*", or the like). The query processor 120 may include a parser that performs the initial parsing of the query into query term and labels. Where there are one more labels in query, the filter constructor 130, may construct domain filter 108 that identifies the domains of documents known to the search engine system 100 to have labels that match the query labels. Filter constructor 130 dynamically adjusts the size of domain filter 108 in order to minimize filter error. This dynamic adjustment of filter size can be carried out on the fly for each query 106. The query processor 120 may pass domain filter 108 and the terms from the query to the search engine 180.

Search engine 180 performs a search on the query terms and may return documents relevant to the query. Where the search engine 180 receives domain filter 108, it may perform an additional filtering function on the search results by including a pre-determined minimum portion (e.g., number or percentage) of documents in the search results which are from domains identified in domain filter 108. The search results are may be passed back to the query processor 120.

II. IMPLEMENTING THE DOMAIN FILTER AS A DYNAMICALLY ADJUSTABLE BLOOM FILTER a) Bloom Filter In one embodiment, domain filter 108 may be implemented as a Bloom filter. As known to those skilled in the art, a Bloom filter may be a space-efficient probabilistic data structure that is used to test whether an element is a member of a set. Here, the Bloom filter may be used by the search engine 180 to test whether the domain of a particular search result is included in the URL pattern(s) for labels that match the query labels.

The Bloom filter may be characterized by the bit array of length L (also called filter length), and a number K of hash function(s) H used to hash entries into the bit array. The number K is based on the number P of different entries to be included in the filter, the filter length L, and a desired false positive rate.

In one embodiment the filter length L may be fixed. P is the number of different domain prefixes that are associated with the one or more query labels. Thus, P is determined after the query labels are matched in the annotation database 140 of a given search query 106 and the set (and hence number) of corresponding domain prefixes D are identified. K is then determined based on L and P. For example, in an embodiment, K is calculated as $$K = \ln 2 \cdot (L/P)$$

In another embodiment, the K hash functions may be based on a Jenkins hash function, known to those skilled in the art. The hashes may be done as follows. On each domain prefix that is to be inserted into domain filter 108, first, a n bit hash is taken of the domain prefix, using, for example, a Jenkins hash. Then for each of the K hash functions that are needed, this n bit hash is rotated by j*i, where i is the index of the hash function, and j is the number of bit(s) by which the n bit hash is to be rotated.

After rotation, the n bit hash may then be modded by the bit vector size. The result is then set at the appropriate bit in domain filter 108.

b) Offset Errors and Effects on Size of the Domain Filter

As mentioned above, according to a feature K can be set based on a desired false positive error rate. False positives are when a filter indicates a URL pattern as being associated with a label when it is not really associated, this can occur for example when the search results may contain documents that come from the domains that match the domain filter, but which do not satisfy the query labels. This domain filter error, due to its false positive rate, may be minimized by dynamically adjusting the size of the domain filter. Thus, a larger number of search results are ensured to be from domains that match the domain filter.

A domain filter offset error contributed by one URL pattern is defined as the number of characters in a URL pattern's path component that were not hashed because of truncation to an offset value.

The domain filter offset error can be defined as the sum of the offset errors contributed by each URL pattern that is hashed into the domain filter bit array. The domain filter offset error may be an integer.

In the example where the domain filter 108 is a Bloom filter, the size of the Bloom filter may be calculated when the Bloom filter error rate and the number of URL pattern(s) are known.

One equation that may be used is:

$$rb = 1 - (1-rt)^{(1/k)} \text{ where}$$

rt is the maximum value of the tolerable error rate while checking for an URL in the Bloom filter where 'rt' may also depend on the domain filter offset error and a Bloom filter inherent error rate, rb is the Bloom filter inherent error rate, and k is the number of offsets.

Once the value of 'rb' is known, for a given number of offsets 'k', the size of the Bloom filter may be calculated with a computational table known to those skilled in the art.

However, it may be necessary to minimize the Bloom filter error 'rb' in order to improve filtering.

The Bloom filter error rate affects the size of the Bloom filter. The error rate of the Bloom filter may also depend on the offset length(s) of URL pattern(s). It is then desirable to find offset lengths that will minimize the Bloom filter error. However, these offset lengths may be subject to a maximum limit on maximum value of the tolerable error rate, 'rt' and the resultant size of the Bloom filter.

The offsets that are selected in order to reduce the domain filter offset error may be subsets of the URL pattern lengths. Furthermore, as the number of offsets hashed into the Bloom filter bit array increases, the domain filter offset error decreases but the Bloom filter error increases.

Where the domain filter 108, which may be a Bloom filter, is constructed using URL prefixes that may be a combination of the domain and some additional number of characters (e.g., 12 characters), the additional number of characters is defined as the domain extension E. The additional characters appearing after a domain may also be referred to as a path component. A stride value is a defined as a factor of the extension E. In order to reduce the error rate of domain filter 108, the extension E is not arbitrarily selected. Arbitrary selection of extension E may increase error rate of domain filter 108. Error rate may increase as characters in an URL pattern may be dropped. If the length of the URL pattern is greater than the value of extension E, the URL pattern is truncated to the value of E.

For example, consider the value of the extension (E) is 12 and stride is 3.

Furthermore, consider a URL pattern such as "www.google.com/coop".

Since the value of the stride is 3, the hash of the pattern "www.google.com/co" is entered into the Bloom filter's bit array. This results in the characters "/co" being selected in the string to be hashed instead of "/coop". Thus, if a stride value of 3 is used, the characters 'o' and 'p' are dropped from the end of the path component "/coop". This will result in an offset error of 2 in this example.

The above approach may cause the false positive rate of domain filter 108 to increase as additional characters in the path component are discarded in order to reduce the size of the Bloom filter.

As an example to illustrate the increase in the false positive rate, consider the following URL pattern
"www.google.com/convert".

Also consider for this discussion that the Bloom filter's bit array contains the hash of the URL pattern(s) of "www.google.com/co" and "www.google.com/coop/cse"

When "www.google.com/convert" is to be filtered with the Bloom filter, all the of the following URL patterns may be matched against the Bloom filter,
"www.google.com"
"www.google.com/co"
"www.google.com/conve"

The above patterns are matched against the Bloom filter because the all the additional characters after the domain are integral multiples of the stride E which in this case is 3.

As a result of this, the URL pattern "www.google.com/convert" may pass domain filter 108 when it should not. It should not have passed domain filter 108 as the filter's bit array contains the hash of the URL pattern(s) of "www.google.com/co" and "www.google.com/coop/cse". This leads to a false positive. An increased number of false positives increases the error rate of the Bloom filter. An increase in the false positive rate may lead to unsatisfactory results being returned to client 102.

It is desirable to adjust the size of the Bloom filter to minimize false positives.

c) Filter Constructor

According to a feature, filter constructor 130 in query processor 120 can construct and dynamically adjust the size of a domain filter 108 that identifies the domains associated with the particular labels included in the user's query.

Filter constructor 130 may receive as an input a set of URL pattern(s) obtained from annotation database 140 based on labels that may be present in the query. The set of URL patterns(s) may include one or more URL patterns. As indicated above, the annotation database 140 includes a collection of annotations, where each annotation comprises a label and a URL pattern. The annotation database 140 may include an inverted index (or equivalent) that indexes each annotation to whatever URL patterns have been defined for it (whether by the same or different authors).

In one embodiment, filter constructor 130 may provide a determination of a value of filter size necessary to minimize filter error. In another embodiment, filter constructor 130 extracts the domain prefix from the URL pattern and adds it to the domain filter 108 in a manner that reduces filter error. The operation of the filter constructor 130 in an embodiment is further explained below.

Figure 2:
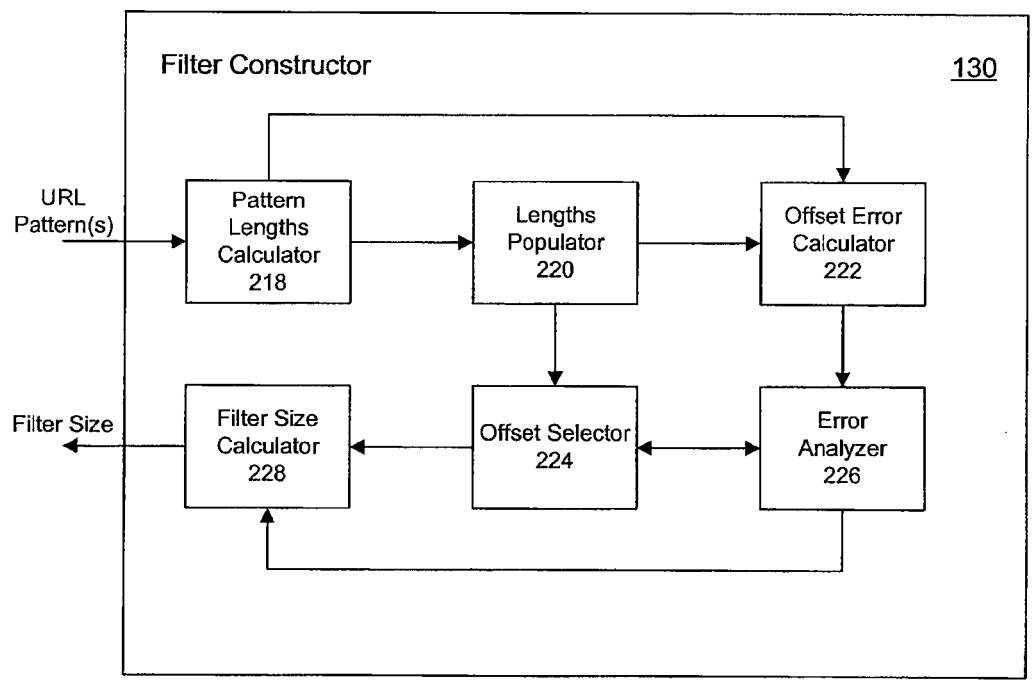
FIG. 2 illustrates a filter constructor according to an embodiment of the invention.

Referring to FIG. 2, filter constructor 130 includes pattern lengths calculator 218, lengths populator 220, offset error calculator 222, offset selector 224, error analyzer 226 and filter size calculator 228.

Pattern lengths calculator 218 calculates a length of each URL pattern and generates a data structure where each entry corresponds to the number of URL patterns having a certain path length. In an example, not intended to limit the invention, the data structure may be an array where the value of each index represents a path length and the data contained at that index contains the number of URL patterns corresponding to the path length of index.

For instance, the array may be called as 'pattern_lengths_count' where pattern_lengths_count [index] equals the numbers of URLs having a pattern length of 'index'.

Lengths populator 220 examines the data structure generated by the pattern lengths calculator 218 and generates a data structure where each entry corresponds to non-zero path lengths of URL pattern(s) for a given set of URL pattern(s). The set of URL patterns(s) may include one or more URL patterns. In an example, not intended to limit the invention, the data structure may be an array called a 'lengths vector' where the data contained at each index corresponds to the URL path length.

Offset error calculator 222 examines the data structures generated by the pattern lengths calculator 218 and the lengths populator 220 to calculate a value of domain filter offset error for a given set of offsets. This domain filter offset error may be output to error analyzer 226. An example embodiment of the offset error calculator 222 will be explained in further detail below.

Offset selector 224 generates a data structure comprising acceptable values of offsets for a given set of URL patterns. Offset selector 224 may use several values as inputs. In an example, not intended to limit the invention, these values may include: (a) an empty data structure in which the acceptable values of the offsets may be stored, (b) the number of offsets that are chosen, (c) an index which points to the data structure containing the offsets, and (d) an index which points to the data structure generated by the lengths populator 220.

In an embodiment, these values may be set initially to the values mentioned below:
offsets may be initialized to a size equal to a number of offsets (num_offsets),
a best offsets value (best_offsets) may initialized to a size equal to num_offsets,
num_offsets=1,
which_len=0,
which_offset=0, and
best_error may be set to a high value.

Furthermore, offset selector 224 may be a recursive component thereby needing the acceptable value of the offset error and a data structure comprising acceptable values of offsets as inputs.

In an embodiment of the invention, offset selector 224 may carry out a depth first traversal of the data structure containing possible offsets in order to perform an exhaustive search to calculate a value(s) of acceptable offsets. A depth first traversal of a data structure may be implemented by an algorithm known to those skilled in the art.

Error analyzer 226 evaluates the domain filter offset error and determines if the current number of offsets leads to an error rate that is satisfactory by using the equation, $rb=1-(1-rt)^{(1/k)}$, as shown earlier in the description. If the error rate is found to be unsatisfactory, the number of offsets used may be increased. This determination may be based on a value of the domain filter offset error and the current number of offsets.

Filter size calculator 228 generates the size of domain filter 108 that may efficiently encode the given number of URL patterns for a given number of offsets.

d) Offset Selector

Figure 3:
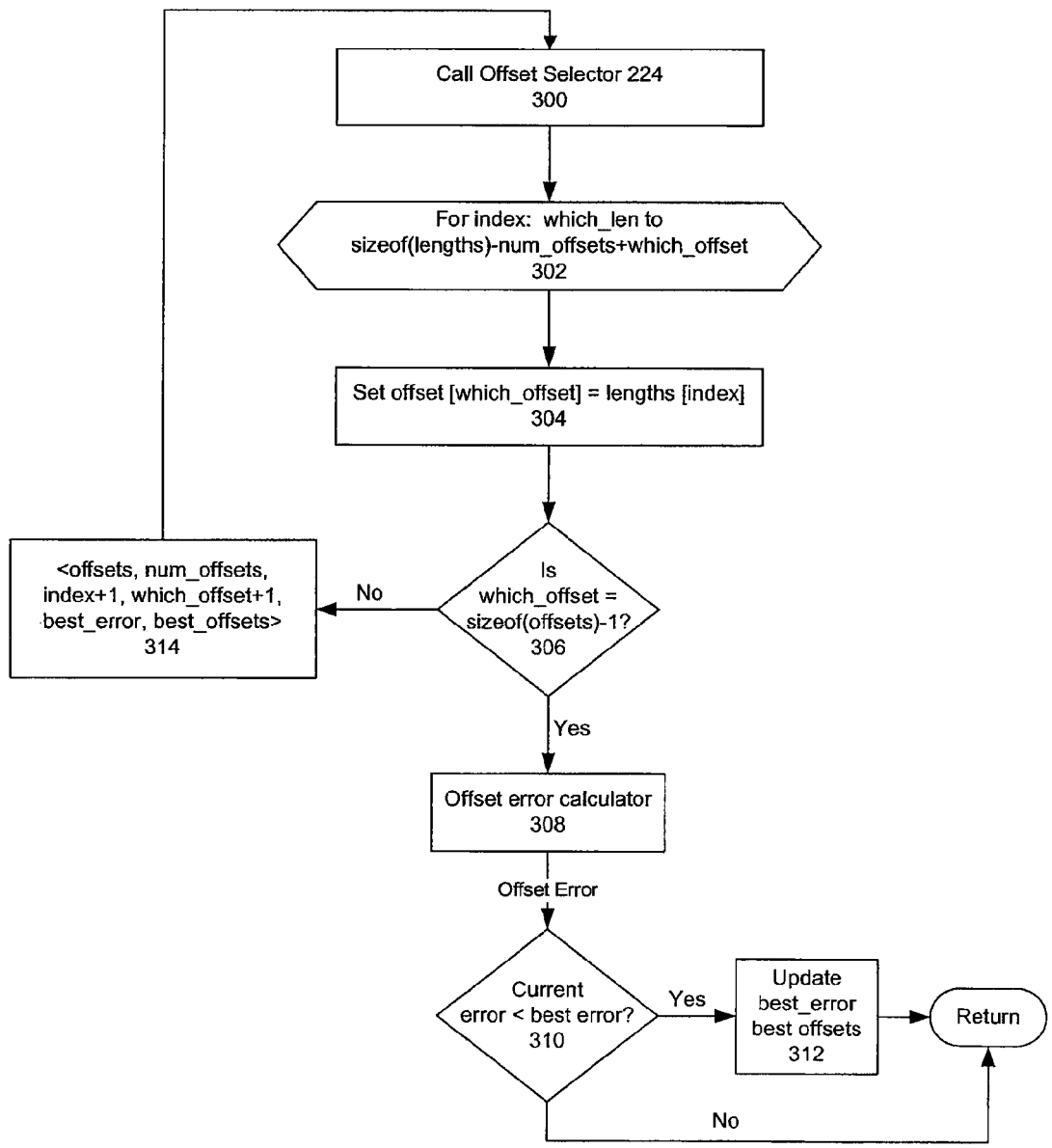
FIG. 3 is a flowchart illustrating the operation of an offset selector according to an embodiment of the invention.

FIG. 3 illustrates a flowchart showing an example operation of offset selector 224 as a method embodiment. Method 300 begins with a call to offset selector 224 (step 300). An index that may be required for recursive calls to method 300 is set (step 302). In an embodiment this index may range from which_len to sizeof(lengths)−num_offsets+which_offset; where sizeof (lengths) is the size of the data structure generated by the lengths populator 220.

num_offsets is the number of offsets that may be generated by offset selector 224.

which_offset refers to an index of the offset that would be generated next.

which_len is an index into the data structure generated by lengths populator 220 and refers to a value of a path length of a URL pattern in that data structure.

The value of the offset contained at an location in a data structure is made equal to a length stored at a location referred by an index to the array of lengths (step 304). In an embodiment, this may be represented as offset[which_offset]=lengths[index] where which_offset refers to an index in the data structure containing values of offsets, and;

offset [which_offset] is the value of an offset in the data structure containing offsets referred to by which_offset.

Offset selector 224 checks if we are generating the last offset (step 306). In an embodiment, this may be represented as which_offset=sizeof(offsets−1)

If the last offset has not been generated and more offsets need to be generated, method 300 is recursively called with the value of the index incremented by one and the value of which_offset incremented by 1 (step 314). Thus method 300 is called again with the following values being provided to offset selector 224.

offsets=offsets,
num_offsets=num_offsets,
index=index+1,
which_offset=which_offset+1,
best_error=best_error, and;
best_offsets=best_offsets When all 'num_offsets' offsets have been determined, the offset error calculator 222 generates a value of the offset error (step 308). Error analyzer 226 then checks whether the current numerical value of the error is less than the numerical value of best error found so far (step 310). If the current value of the error is less than the value of the best error, the value of the best error and the best offsets is updated by offset selector 224 and method 300 returns. If the current value of the error is greater than the value of the acceptable error, then method 300 returns. Method 300 is called recursively depending on an evaluation by the offset selector 224 at step 306.

In this way, offset selector 224 generates a value of offset(s) that yields the smallest error rate amongst all possible offset combinations for 'num_offset' offsets.

e) Dynamically Adjusting the Size of the Domain Filter

Figure 4:
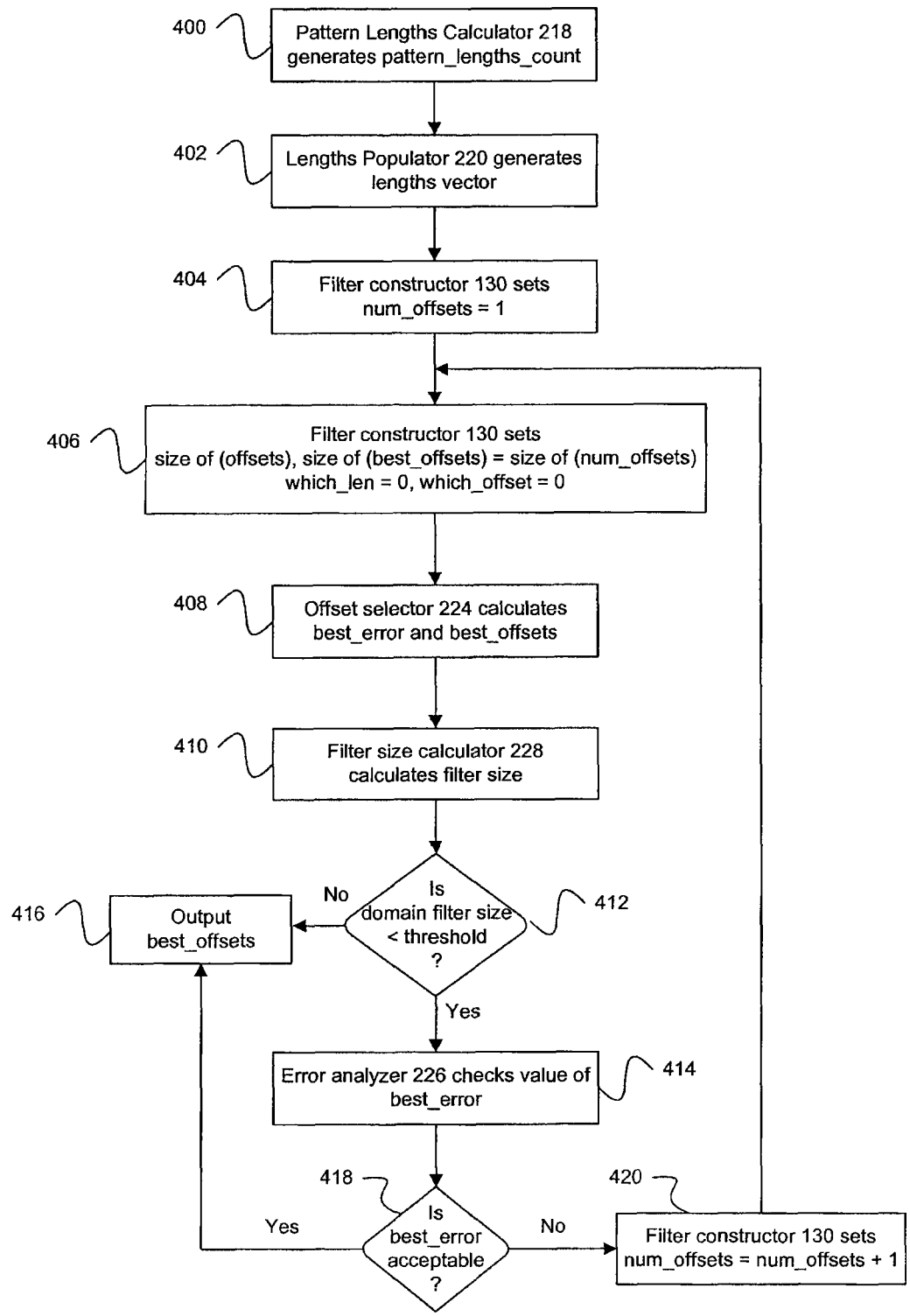
FIG. 4 is a flowchart illustrating the operation of a filter constructor using an offset selector according to an embodiment of the invention.

FIG. 4 is a flowchart illustrating the dynamic adjustment of the size of domain filter 108, implemented as a Bloom filter.

The pattern lengths calculator 218 receives a set of URL pattern(s) and generates a 'pattern_lengths_count' array (step 400). Lengths populator 220 may generate an array called as a 'lengths vector' using the 'pattern_lengths_count' array (step 402). The value of "num_offsets" needed by offset selector 224 is then set to the value of '1' by filter constructor 130 (step 404). Filter constructor 130 then sets the sizes of the "offsets" and the "best_offsets" data structures needed by offset selector 224 to the size of "num_offsets". Furthermore "which_len" and "which_offset" are set to a value of 0 by filter constructor 130. "best_error" is also set to a very high value in this step (step 406). Offset selector 224 then identifies "best_offsets" by recursively calling method 300 as illustrated in FIG. 3. Offset selector 224 then generates "best_offsets" and "best_error" (step 408). Filter size calculator 228 then checks if the size of domain filter 108 is less than a threshold (step 412). If the size of domain filter 108 is less than the threshold, offset selector 224 outputs "best_offsets" (step 416). If the size of domain filter 108 is less than a threshold, error analyzer 226 checks the value of "best_error" (step 418). If the value of "best_error" is found to be acceptable by error analyzer 226, offset selector 224 outputs "best_offsets" (step 416). If the value of "best_error" is found to be un-acceptable, filter constructor 130 increases "num_offsets" by 1 (step 420). The incremented value of "num_offsets" may be provided to filter constructor 130.

In this way the size of domain filter 108 may be dynamically adjusted to minimize the filter error.

III. EXAMPLE OPERATION OF A PATTERN LENGTHS CALCULATOR

FIG. 5 illustrates a table which contains several example URL patterns that may be included in a search engine. The figure lists the each example URL pattern followed by its path component and the corresponding length of the path component or pattern length.

Pattern lengths calculator 218 calculates a length of each URL pattern and generates a data structure where each entry corresponds to the number of URL patterns having a certain path length. In an example, not intended to limit the invention, the data structure may be an array where each the value of each index represents a path length and the data contained at that index contains the number of URL patterns corresponding to the path length of index. Referring to FIG. 5, the output of the pattern lengths calculator may be an array called 'pattern_lengths_count'.

In the case of the URL patterns illustrated in FIG. 5, pattern_lengths_count array may be generated as follows pattern_lengths_count=
[0|0|0|1|0|1|0|1|0|0|0|1|1|2|0|0|0|0|1|0|1| 0|1]

From the above pattern_lengths array, it may be inferred that there is one URL pattern each with a path lengths of 3, 5, 7, 11, 12, 18, 20 and 22 and two URLs with path length of 13.

IV. EXAMPLE OPERATION OF A LENGTHS POPULATOR

Lengths populator 220, examines the data structure generated by the pattern lengths calculator 218 and generates a data structure where each entry corresponds to non-zero lengths of URL patterns for a given set of URL patterns. The set of URL patterns may include one or more URL patterns. In an example, not intended to limit the invention, the data structure may be an array where the data contained at each index corresponds to the URL path length.

In the case of the URL patterns referred to in FIG. 5 an array known as "lengths vector" may be generated as follows:

lengths vector=[3|5|7|11|12|13|18|20|22]

From the above lengths array, the length of each URL pattern in the search engine may be inferred.

V. EXAMPLE OPERATION OF AN OFFSET ERROR CALCULATOR

Offset error calculator 222, examines the data structures generated by the pattern lengths calculator 218 and the lengths populator 220 to calculate a value of a domain filter offset error for a given set of offsets identified by offset selector 224.

For example, if we are given the offsets vector [3|12|20] and the pattern_lengths_count vector from the above example, it calculates the domain filter offset error as follows:

URL patterns that use an offset value of 3 may be URL patterns that have path lengths greater than or equal to 3 and less than the next offset. The next offset the example URL patterns illustrate, in FIG. 5, is 12. This includes all URLs with path lengths 3, 5, 7 and 11.

Domain filter offset error contributed by URLs with path length m and are going to use offset 3 may be given by the formula, pattern_lengths_count[$m$]*($m$−3)

Therefore, domain filter offset error contributed by URLs that are going to use offset 3 is Σ pattern_lengths_count[$m$]*($m$−3)=1*(3−3)+1*(5−3)+1*(7−3)+1*(11−3)=14.

In a similar fashion URL patterns with path lengths of 12, 13 and 18 are may use offset value of 12.
They contribute a domain filter offset error of

1*(12−12)+2*(13−12)+1*(18−12)=8

URL patterns with path lengths of 20 and 22 will use offset 20 and will contribute to a domain filter offset error of

1*(20−20)+1*(22−20)=2.

The offset vector [3|12|20] causes a domain filter offset error which is the summation of 14, 8 and 2. Thus in this example operation of offset error calculator, the offset error is:

14+8+2=24

In this way, offset error calculator 222 may generate values of offset errors.

VI. CONCLUSION

In discussion of the various embodiments, examples have been discussed using search queries including a single query term and a single label, as well as examples referencing individual documents. It is understood that the embodiments and invention are not so limited, and should be generally understood as equally operable with queries including a plurality of query terms and a plurality of labels. Thus any reference herein; including in the claims below, to various words in the singular noun form, such as query term, label, annotation, document, filter, and so forth, are not intended to be limited to the singular, but should be read as including at least one or a plurality thereof, unless such a construction is expressly indicated as not intended or appropriate for the circumstances.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various systems components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention have been described using commands, mnemonics, tokens, formats, syntax, and other programming conventions. The particular selection of the names, formats, syntax, and the like are merely illustrative, and not limiting. Those of skill in the art can readily construct alternative names, formats, syntax rules, and so forth for defining context files and programming the operations a programmable search engine via context processing.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method performed by one or more computers, the method comprising:
    maintaining a collection of uniform resource locator (URL) patterns, wherein each URL pattern is associated with a respective label;
    receiving a search query that includes a query term and a label of interest from a client device;
    generating, for the label of interest, by operation of a computer system, a domain filter that satisfies a maximum size threshold and a maximum false positive error rate threshold, wherein generating the domain filter includes:
        iteratively adjusting a size of the domain filter, wherein in each iteration, the method comprises:
            identifying a new set of one or more URL patterns as a current set of offsets, wherein each of the one or more URL patterns is associated with a respective label that matches the label of interest;
            processing the URL patterns in the collection of URL patterns to generate an offset error for the current set of offsets; and
            determining whether or not the offset error for the current set of offsets is greater than an offset error for a best set of offsets,
                (i) and if so, performing a next iteration unless no new set of one or more URL patterns is identifiable,
                (ii) and otherwise, determining whether or not a current size of the domain filter satisfies the maximum size threshold and a current error rate for the domain filter satisfies the maximum false positive error rate threshold, (a) and if so, replacing values of the best set of offsets with values of the current set of offsets and performing the next iteration unless no new set of one or more URL patterns is identifiable, (b) and otherwise, performing the next iteration unless no new set of one or more URL patterns is identifiable; and
        upon determining that no new set of one or more URL patterns is identifiable, generating the domain filter for the label of interest using values of the best set of offsets; and
    filtering search results that are relevant to the query term with the domain filter to generate a plurality of filtered search results.

2. The method of claim 1, further comprising:
providing the plurality of filtered search results to the client device.

3. The method of claim 1, further comprising:
maintaining a collection of documents, wherein each document has a respective document URL, and wherein the maintaining includes, for each document, identifying a URL pattern in the collection of URL patterns that is satisfied by the respective document URL, and applying a label that is associated with the identified URL pattern to the document.

4. The method of claim 3, further comprising:
processing the plurality of filtered search results to remove one or more filtered search results, wherein each filtered search result that is removed identifies a respective document that has no label that matches the label of interest.

5. The method of claim 1, further comprising:
determining a respective URL pattern length of each URL pattern in the collection of URL patterns, wherein the URL pattern length of a particular URL pattern is a value corresponding to a number of alphanumeric characters that appears after a domain name in the particular URL pattern.

6. The method of claim 1, further comprising:
generating count information for the collection of URL patterns, wherein the count information includes a respective count of a number of URL patterns in the collection of URL patterns having each distinct URL pattern length.

7. The method of claim 1, wherein processing the URL patterns in the collection of URL patterns comprises:
processing the URL patterns in the collection of URL patterns using the current set of offsets and count information for the collection of URL patterns, wherein the count information includes a respective count of a number of URL patterns in the collection of URL patterns having each distinct URL pattern length.

8. The method of claim 1, wherein each new set of one or more URL patterns is distinct from a previously identified set of one or more URL patterns.

9. A system comprising:
one or more computers;
a computer program including instructions, stored on a non-transitory computer-readable storage medium, that when executed by the one or more computers, cause the one or more computers to performs operations comprising:
    maintaining a collection of uniform resource locator (URL) patterns, wherein each URL pattern is associated with a respective label;
    receiving a search query that includes a query term and a label of interest from a client device;

generating, for the label of interest, a domain filter that
satisfies a maximum size threshold and a maximum
false positive error rate threshold, wherein generating
the domain filter includes:
iteratively adjusting a size of the domain filter,
wherein in each iteration, the method comprises:
identifying a new set of one or more URL patterns
as a current set of offsets, wherein each of the one
or more URL patterns is associated with a
respective label that matches the label of interest;
processing the URL patterns in the collection of
URL patterns to generate an offset error for the
current set of offsets; and
determining whether or not the offset error for the
current set of offsets is greater than an offset
error for a best set of offsets,
(i) and if so, performing a next iteration unless no
new set of one or more URL patterns is identifiable,
(ii) and otherwise, determining whether or not a
current size of the domain filter satisfies the
maximum size threshold and a current error rate
for the domain filter satisfies the maximum false
positive error rate threshold, (a) and if so, replacing values of the best set of offsets with values of
the current set of offsets and performing the next
iteration unless no new set of one or more URL
patterns is identifiable, (b) and otherwise, performing the next iteration unless no new set of
one or more URL patterns is identifiable; and
upon determining that no new set of one or more URL
patterns is identifiable, generating the domain filter
for the label of interest using values of the best set
of offsets; and
filtering search results that are relevant to the query term
with the domain filter to generate a plurality of filtered
search results.

10. The system of claim 9, wherein the operations further comprise:
providing the plurality of filtered search results to the client device.

11. The system of claim 9, wherein the operations further comprise:
maintaining a collection of documents, wherein each document has a respective document URL, and wherein the maintaining includes, for each document, identifying a URL pattern in the collection of URL patterns that is satisfied by the respective document URL, and applying a label that is associated with the identified URL pattern to the document.

12. The system of claim 11, wherein the operations further comprise:
processing the plurality of filtered search results to remove one or more filtered search results, wherein each filtered search result that is removed identifies a respective document that has no label that matches the label of interest.

13. The system of claim 9, wherein the operations further comprise:
determining a respective URL pattern length of each URL pattern in the collection of URL patterns, wherein the URL pattern length of a particular URL pattern is a value corresponding to a number of alphanumeric characters that appears after a domain name in the particular URL pattern.

14. The system of claim 9, wherein the operations further comprise:
generating count information for the collection of URL patterns, wherein the count information includes a respective count of a number of URL patterns in the collection of URL patterns having each distinct URL pattern length.

15. The system of claim 9, wherein the operations of processing the URL patterns in the collection of URL patterns comprise:
processing the URL patterns in the collection of URL patterns using the current set of offsets and count information for the collection of URL patterns, wherein the count information includes a respective count of a number of URL patterns in the collection of URL patterns having each distinct URL pattern length.

16. The system of claim 9, wherein each new set of one or more URL patterns is distinct from a previously identified set of one or more URL patterns.

17. A computer program product including instructions, stored on a non-transitory computer-readable storage medium, that when executed by one or more computers, cause the one or more computers to perform operations comprising:
maintaining a collection of uniform resource locator (URL) patterns, wherein each URL pattern is associated with a respective label;
receiving a search query that includes a query term and a label of interest from a client device;
generating, for the label of interest, a domain filter that satisfies a maximum size threshold and a maximum false positive error rate threshold, wherein generating the domain filter includes:
iteratively adjusting a size of the domain filter, wherein in each iteration, the method comprises:
identifying a new set of one or more URL patterns as a current set of offsets, wherein each of the one or more URL patterns is associated with a respective label that matches the label of interest;
processing the URL patterns in the collection of URL patterns to generate an offset error for the current set of offsets; and
determining whether or not the offset error for the current set of offsets is greater than an offset error for a best set of offsets,
(i) and if so, performing a next iteration unless no new set of one or more URL patterns is identifiable,
(ii) and otherwise, determining whether or not a current size of the domain filter satisfies the maximum size threshold and a current error rate for the domain filter satisfies the maximum false positive error rate threshold, (a) and if so, replacing values of the best set of offsets with values of the current set of offsets and performing the next iteration unless no new set of one or more URL patterns is identifiable, (b) and otherwise, performing the next iteration unless no new set of one or more URL patterns is identifiable; and
upon determining that no new set of one or more URL patterns is identifiable, generating the domain filter for the label of interest using values of the best set of offsets; and
filtering search results that are relevant to the query term with the domain filter to generate a plurality of filtered search results.

18. The product of claim 17, wherein the operations further comprise:

providing the plurality of filtered search results to the client device.

19. The product of claim 17, wherein the operations further comprise:
    maintaining a collection of documents, wherein each document has a respective document URL, and wherein the maintaining includes, for each document, identifying a URL pattern in the collection of URL patterns that is satisfied by the respective document URL, and applying a label that is associated with the identified URL pattern to the document.

20. The product of claim 19, wherein the operations further comprise:
    processing the plurality of filtered search results to remove one or more filtered search results, wherein each filtered search result that is removed identifies a respective document that has no label that matches the label of interest.

21. The product of claim 17, wherein the operations further comprise:
    determining a respective URL pattern length of each URL pattern in the collection of URL patterns, wherein the URL pattern length of a particular URL pattern is a value corresponding to a number of alphanumeric characters that appears after a domain name in the particular URL pattern.

22. The product of claim 17, wherein the operations further comprise:
    generating count information for the collection of URL patterns, wherein the count information includes a respective count of a number of URL patterns in the collection of URL patterns having each distinct URL pattern length.

23. The product of claim 17, wherein the operations of processing the URL patterns in the collection of URL patterns comprise:
    processing the URL patterns in the collection of URL patterns using the current set of offsets and count information for the collection of URL patterns, wherein the count information includes a respective count of a number of URL patterns in the collection of URL patterns having each distinct URL pattern length.

24. The product of claim 17, wherein each new set of one or more URL patterns is distinct from a previously identified set of one or more URL patterns.

* * * * *